United States Patent [19]

Anderson

[11]  4,422,327
[45]  Dec. 27, 1983

[54] LIQUID LEVEL INDICATOR APPARATUS
[75] Inventor: Stig Anderson, V. Frölunda, Sweden
[73] Assignee: Ingenjörsfirman Installationsjänst AB, Hisings Backa, Sweden
[21] Appl. No.: 244,894
[22] Filed: Mar. 18, 1981
[51] Int. Cl.³ .................. G01F 23/00; B65G 11/20
[52] U.S. Cl. ............................ 73/303; 137/874; 137/875
[58] Field of Search .................. 73/302, 303; 137/625.11, 625.44, 874, 875; 251/177, 228, 231

[56] References Cited

U.S. PATENT DOCUMENTS

| 2,871,883 | 2/1959 | Dunlap | 137/625.11 |
| 2,979,963 | 4/1961 | Snoy | 137/625.11 |
| 3,527,252 | 9/1970 | Cook et al. | 137/608 |
| 4,064,752 | 12/1977 | Murphy, Jr. et al. | 73/302 |
| 4,072,053 | 2/1978 | Anderson | 73/747 X |
| 4,333,390 | 6/1982 | Hegg | 137/625.11 |

FOREIGN PATENT DOCUMENTS

| 384464 | 11/1923 | Fed. Rep. of Germany | 137/392 |
| 2368020 | 5/1978 | France | 116/227 |
| 123729 | 2/1919 | United Kingdom | 417/1 |

Primary Examiner—Daniel M. Yasich

[57] ABSTRACT

A liquid level indicator apparatus including a selecting device intended to indicate the level of at least two liquid bodies. The apparatus comprises a chamber having a display tube and containing an indicator liquid. An air passage is connected between the chamber and the selecting device. Air conduits extend from the selecting device to the liquid bodies, whereby these air conduits and dip tubes are immersed in the liquid bodies. The indicator apparatus contains an air displacing member. Upon operation of the air displacing member the volume of the liquid which level is to be measured present inside the dip tube is expelled due to the air pressure built up inside the conduit. Thereafter the pressure of the liquid body is brought into communication with the chamber containing the indicator liquid, such that the level of the indicator liquid inside the display tube is raised to a level corresponding to the level of the selected liquid body. By means of a pivotably arranged selecting member any one of the liquid bodies may be brought into communication with the indicating apparatus. The switching member is guided by notches and projections therebetween, such that it moves adjacent to any notch defining a selected position axially of the air passage such that when the switching member is in any selected position an airtight connection is established between the switching member and the air passage. The switching member is spring biassed against the notches.

1 Claim, 5 Drawing Figures

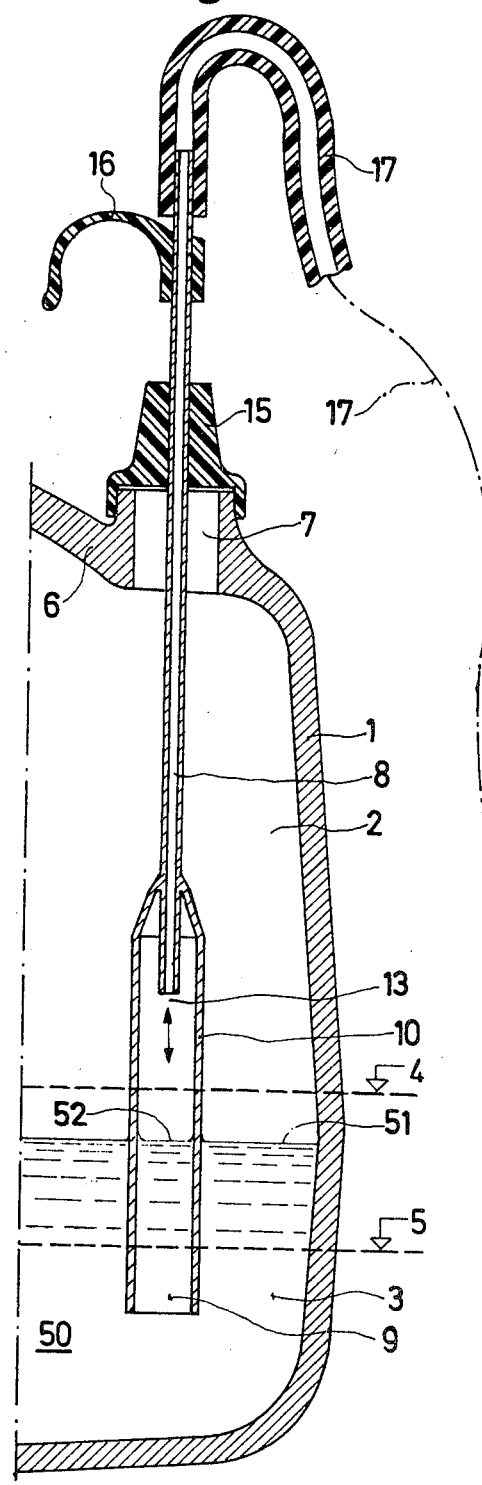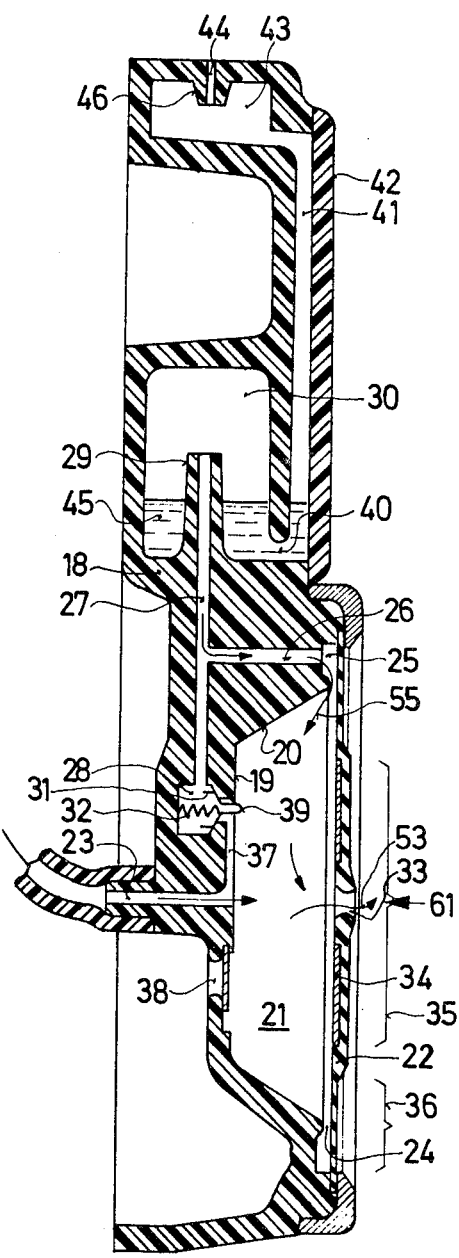

LIQUID LEVEL INDICATOR APPARATUS

BACKGROUND OF THE INVENTION

1. Field of the Invention

The present invention relates to a liquid level indicator apparatus including a selecting means intended to indicate the level of at least two liquid bodies including a chamber having a display tube and containing an indicator liquid which chamber is arranged within the indicator apparatus, an air passage connected between the chamber and said selecting means, at least two air conduits connected between said selecting means and said at least two liquid bodies, at least two dip tubes immersed in said liquid bodies and connected each to one of said air conduits, an air displacing means arranged within said indicator apparatus and operatively connected to said air passage.

Liquid level indicator apparatus for indicating the level of a liquid arranged in a container such as e.g. to indicate the oil level in the crankcase of an internal combustion motor are known. Such apparatus are connected by the agency of a hose with a dip tube or measuring tube, respectively, which is immersed into said liquid body, whereby the indicator apparatus contains a manually operated displacing member which upon operation forces a volume of air out of the dip tube which air rises in form of bubbles to the level of the liquid. Thereafter a connection arranged between the hose and the dip tube of the indicator device is opened, such that the outer liquid pressure prevailing in the container can force the air column within said hose upwardly and this air column forces in turn an indicator liquid arranged in a display tube up to a certain height, which height rises in accordance with the rising liquid level in such container.

2. Description of the Prior Art

A liquid level indicator of the kind mentioned above is disclosed for instance in the U.S. Pat. No. 4,072,053 and is mainly intended to display the level of the oil in the crankcase of an internal combustion motor.

It is, however, often the case that a motor vehicle is provided with several oil tanks or oil containers of which the liquid level must be determined. Many motor vehicles comprise an automatic transmission, having an oil as working fluid and many motor vehicles comprise further a container for a hydraulically oil which is needed in hydraulic operated devices of the vehicle, such as for instance a hydropneumatic suspension.

Quite obviously it would be possible to use for all mentioned containers individual indicator devices of the construction mentioned above; however, several such indicator devices occupy an accordingly large space and the installation thereof is considerably more expensive than the installation of one single apparatus specifically in such case when such indicator devices are mounted additionally at a later date. The solution which would appear in the first instance as an easy solution, namely to utilize a multi-valve arrangement to selectively connect one single indicator apparatus to the hoses of all individual liquid containers, is not possible because any such device must be constructed as compactly as possible such as to allow its mounting to the armature board of the motor vehicle. Thereby the air volumes working inside such arrangements would be extremely small such that the precision of the display would suffer considerably due to the switching-in of a multi-valve arrangement. Furthermore, the relatively large dimensions of such valves forbid a practical mounting thereof into the indicator apparatus, whereby at the same time a separate mounting of such valve is not possible due to technical, economical and also aesthetical reasons.

SUMMARY OF THE INVENTION

Hence, it is a general object of the present invention to provide an improved construction of a liquid level indicator apparatus including a selecting means intended to indicate the level of at least two liquid bodies which is simple and compact in construction and design, reliable in operation, dependable in use and easily mountable into a motor vehicle.

Now in order to implement these and still further objects of the invention, which will become more readily apparent as the description proceeds, the selecting apparatus of this development is manifested by the features that a selecting member is arranged at said selecting apparatus to connect one chosen conduit of said several conduits between said liquid bodies and said air passage, whereby the movement of the selecting member to and from the selecting position is guided such that said selecting member is given at a position adjacent to said selecting position an axial movement relative to said air passage, and causes in such a selecting position a sealed connection with said air passage which is determined by notches and by a spring loading.

A further object is to provide a liquid level indicator apparatus including a selecting means intended to indicate the level of at least two liquid bodies which is manifested by the features that said selecting means comprises a switching member for individually connecting a selected one of said air conduits with said air passage and wherein there is provided a series of notches, each defining a switching position of said switching member and wherein there is provided further a spring arrangement biassing said switching member against said series of notches for a positive guidance thereof, whereby upon said switching member approaching any one of said switching positions it is guided for a movement axially of said air passage, and whereby in the switching position of said switching member a sealed connection between said switching member and said air passage is established through the action of said spring bias and one of said notches.

A further object is to provide a liquid level indicator, wherein the switching member is pivotably supported and wherein the notches are separated from each other by projections, whereby the projections guide said axial movements of said switching member.

Yet a further object is to provide a liquid level indicator which is provided with a carrier block having at least two through holes, each through hole connected at one end by means of one air conduit to one dip tube and by the opposite end by means of a flexible hose to said switching member, whereby upon movement of the switching member any one of the flexible hoses can be aligned with said air passage.

A further object is to provide a liquid level indicator, wherein the switching member comprises a pivotably supported flat arm including a stem section ending in a grip section, whereby said notches have a V-shaped cross-sectional shape and wherein said stem section comprises a V-shaped cross-sectional shape corresponding to said notches for allowing said stem section to engage into any of said notches, which stem section is spring biassed against said notches.

A still further object is to provide a liquid level indicator having the switching member pivotably supported at a back wall of the indicator apparatus and whereby said grip section protrudes laterally of said indicator apparatus, wherein said notches are arranged in a side wall of said indicator apparatus.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIGS. 1a and 1b are a sectional view of an oil level indicator device used together with the selector device;

DETAILED DESCRIPTION OF A PREFERRED EMBODIMENT

Figure 2:
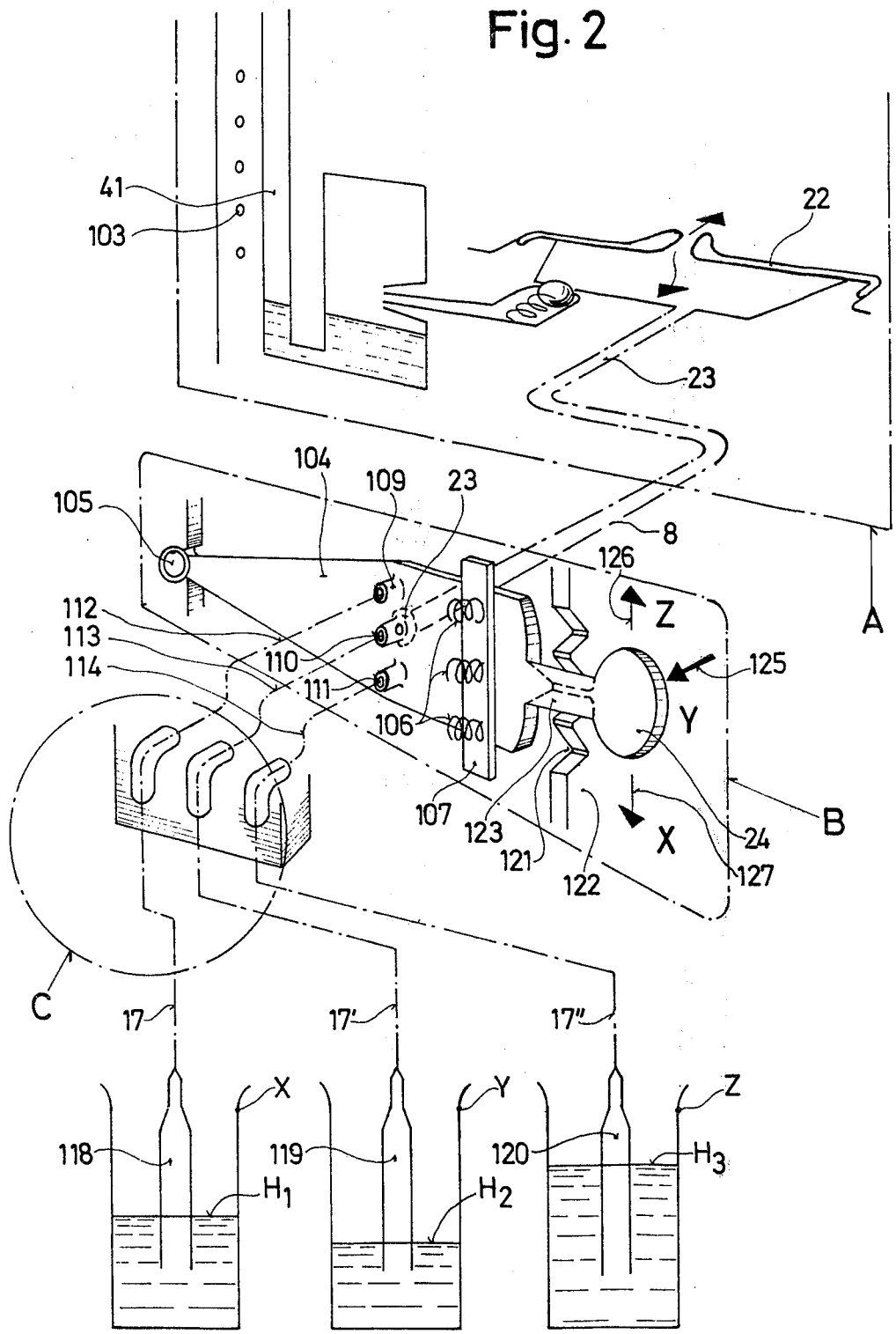
FIG. 2 is a schematic view of an embodiment of the indicator device, the selecting device, a carrier block, three liquid bodies and the connecting hoses.

In FIG. 1 there is shown a section through a part of the crankcase of a motor vehicle. The wall 1 of the crankcase surrounds an oil sump 2. The oil 3 located in the oil sump 2 may move between a highest level 4 and a lowest level 5. In the upper section 6 of the wall 1 of the crankcase there is provided an opening 7, through which opening a narrow measuring tube 8 extends, which measuring tube 8 arranged as a dip tube extends into the crankcase such that its lower open end 9 is at a level which is lower than the lowest allowable oil level 5. The diameter of the lower tube section 10 of the measuring tube 8 is widened to about 5 mm such that the measuring tube 8 may be inserted through the opening 7. This lower tube section 10 having an enlarged diameter is given such a longitudinal extent that the highest allowable oil level 4 does not reach the opening 13 of the measuring tube 8, which opening 13 defines the transition between the enlarged tube section 10 and the narrow measuring tube 8. Preferably the measuring tube 8 penetrates somewhat into the enlarged tube section 10. The measuring tube 8 is locked in its position with regard to the oil levels 4 and 5 by means of an adjustable sealing gland 15. This sealing gland 15 allows that the measuring tube 8 can be adjusted such that it can be mounted into motors having various sizes and of various manufacture. The measuring tube 8 is provided with a grip 16 for aiding its installation into the crankcase and its retrieval therefrom, respectively.

The measuring tube 8 is connected to a small, narrow hose 17, which hose leads to an indicator gauge (see FIG. 1b), which is mounted in the armature board of a motor vehicle or of the motor, machine etc. which has to be monitored. The inner cross section of the hose 17 must be as small as possible (for instance a bore of 1 to 2 mm).

The casing 18 of this indicator gauge comprises a chamber 21 defined by a bottom wall 19 and a side wall 20 and defined furthermore by a cover formed by a membrane 22. The chamber 21 comprises a stub 23, whereby mentioned hose 17 is connected to said stub and accordingly to chamber 21, whereby as mentioned above, said hose 17 is connected by its opposite end to the measuring dip tube 8. The side wall 20 of chamber 21 having in this preferred embodiment the shape of a truncated cone defines together with the membrane 22, if latter is not pressed in, thus is in its released position as shown, a very narrow annular clearance 24 (about 1/10 mm), which annular clearance 24 defines a connection between the chamber 21 and an annular groove 25 surrounding the chamber. A channel 26 connects this annular groove 25 to a further channel 27, whereby the lower end of the channel 27 opens into a valve chamber 28 and the upper end opens via a further stub 29 into a liquid containing chamber 30.

A valve 31 is arranged in the valve chamber 28, which valve 31 separates the valve chamber 28 from the air chamber 21 through the action of a spring 32. The center of the membrane 22 is provided with a through hole 33, which through hole connects the inner space of the air chamber 21 with the atmosphere. The central portion 35 of membrane 22 is stiffened by means of a rigid metal plate 34 or the like, such as to prevent a deformation of this central portion, whereby the outer rim portion 36 of the membrane is formed of rubber or any elastomeric, flexible material such that it yields resiliently and allows a pressing-in of the membrane 22 against or onto the bottom wall 19 of the chamber 21.

An open groove 37 extends between the channel defined by stub 23 and the valve chamber 28 such that a flow of air is possible between the valve chamber 28 and the inner space of the stub 23, also if the membrane 22 abuts the bottom wall 19, i.e. is pressed against the bottom wall 19.

A check valve 38 arranged in the bottom wall 19 prevents the air from flowing out of the chamber 21 in case super atmospheric pressure exists in the chamber 21, which check valve 38 opens in case a subatmospheric pressure prevails in the chamber and thus allows air to enter therein. The valve 31 is provided with a projection 39, which projects a few tenths of a millimeter from the bottom wall 19. This arrangement allows that the valve 31 is moved into its open position as soon as the membrane 22 is pressed down to the bottom wall 19 of the chamber 21 and abuts said bottom wall 19.

A passage 40 is arranged within the liquid containing chamber 30 of the casing and thus forms a communication with an indicator tube 41, which indicator tube 41 is covered at its outside by a display glass 42. The indicator tube 41 leads at its upper end into a safety chamber 43, which safety chamber 43 is provided with a passage 44 such as to form a connection to the ambient air.

The volume of the display liquid 45 arranged in the chamber 30 is such that in case of a rise in pressure in the chamber 30 the display liquid 45 can fill the indicator tube 41 to its complete longitudinal extent, whereby the air in chamber 30 above the liquid contained therein will in no case reach passage 40.

Both channels 27 and 44 are led into their respective chambers 30, 43 by means of pipe stubs 29 and 46, respectively, projecting somewhat into these chambers 30, 43, respectively. Thereby, the longitudinal extent of these pipe stubs 29 and 46 is chosen such that the ends thereof are located centrally in their respective chambers such that a leaking out of liquid during shipment and handling of the apparatus, in which cases the apparatus may take any position, is prevented.

In the following the operation of the apparatus will now be explained.

In FIGS. 1a and 1b the indicating apparatus is shown in its rest position, i.e. in its not operating position.

As mentioned earlier, the oil 50 arranged in the crankcase (see FIG. 1a) is at a normal operating level 51, which level may shift somewhat and may be somewhat higher or lower. The movements of the motor vehicle and the motor itself cause a rather large movement of the oil level. This causes the oil level 52, which is defined by the oil in the measuring tube section 10, to be somewhat pulsating and accordingly the air present in the tube 9 to be alternatingly pushed out and sucked in. However, in no case will an overpressure be formed because the tube 10 is connected to stub 23, to chamber 21 and accordingly communicates with the through hole 33 in the membrane 22 and conclusively is in communication with the atmosphere. In FIG. 1b this is shown by means of the arrow 53. A building up of pressure due to a rise of temperature is also not possible due to above described arrangement. The arrow 55 in FIG. 1b indicates that the pressure chamber 30 of the indicator device communicates in a similar way with the ambient air by means of the channels 27 and 26, of the annular clearance 24, the chamber 21 and finally again the through hole 33. When the motor is operating, the entire indicator device is not operating and no liquid column appears in the indicator tube 41.

If now the oil level shall be determined, for instance when filling gas or petrol, respectively, into the motor vehicle, the motor is not in operation. The operating person presses with his finger against the membrane 22. The finger covers firstly the through hole 33, which blocks the communication between the ambient air and the pipe system 17, 8, 10 as well as with the channel system, which communicates with the liquid containing chamber 30 of the display apparatus. The membrane 22 is pushed thereafter in the direction indicated with the arrow 61 in FIG. 1b and accordingly the annular clearance 24 is blocked off. Accordingly, the indicating apparatus is separated from the air chamber 21 and the pipe arrangement leading to the crankcase or oil sump 2, respectively. Thereafter the membrane is pushed by the finger further against the bottom wall 19 of the chamber 21. Thereby the air present in this chamber 21 will be expelled and flows through the stub 23, into hose 17 and finally down into the measuring tube 8. Conclusively, any oil which possibly is present in the tubes 8 and 10 is pushed out. The oil level 52 will accordingly be pushed down below the lower end 9 of the tube section 10 and bubbles up through the oil arranged in the crankcase. Because the tube and hose arrangement have relatively small inner diameters, the air volume 21 is sufficient for a thorough rinsing of the complete pipe arrangement in spite of this volume being extremely small. During this scavenging the liquid containing chamber 30 is blocked off including its inner channel arrangement due to the blocking off of the annular clearance 24 and accordingly no sudden pressure rises can appear therein, which avoids a faulty level indication.

Because the membrane 22 yields only at its rim portion due to the above described metal plate 34 only this rim or outer, respectively, portion 36 is flexed, whereby the central portion 35 of the membrane 22 is flatly pressed against the bottom wall 19 of the chamber. Accordingly, any influence due to various sizes of the human finger is overcome. The valve 31 is operated by the membrane 22 at its projection 39 and this operation occurs immediately prior to the membrane 22 abutting against the bottom wall 19. This causes the valve 31 to open, and accordingly, a communication is established between chamber 30, channel 27, valve 31, connecting groove 37 and the system 23, 17, 8, 10. Oil which is present outside of the tube section is therefore pressed upwards within the tube to a small extent. The air present in the system is now pressurized somewhat and transmits the oil pressure prevailing in the crankcase into the liquid containing chamber 30. The level of the display liquid 45 in chamber 30 will accordingly be depressed somewhat and at the same time the liquid portion present in the indicator tube 41 is raised. The level height of this liquid column in the indicator tube 41 is directly proportional to the oil level within the crankcase. A graduation made accordingly at the display glass 42 allows conclusively to read the oil level in the crankcase immediately and without any further measures.

After reading the oil level as shown by the level of the liquid in the indicator tube 41 the membrane 22 is released and returns immediately into its flat rest position. Thereby, valve 31 closes first. Accordingly, the indicator apparatus is again blocked; however, it is still possible to read the level of the indicating liquid. During the returning movement of the membrane 22 ambient air flows through the through hole 33, which prevents the forming of a subatmospheric pressure in the pipe arrangement 10, 8, 17, 23. It is not desired to have oil sucked into the system, and to this end the additional valve 38 is mounted into the bottom wall 19. This valve 38 prevents that during the rising of the pressure inside chamber 21 a release of pressurized air is possible, allows however if necessary that air can flow into the chamber 21 upon the return movement of membrane 22 into its rest position. Shortly before membrane 22 will arrive at its rest position, the annular clearance 24 is given free. Thereby, the indicator apparatus is again at its zero or rest position, and the entire apparatus returns into its neutral position such as shown in FIGS. 1a and 1b. Then again the indicator apparatus does not respond to temperature changes as well as to pressure changes.

Considering now FIG. 2 the indicating apparatus as shown in FIG. 1b is drawn very schematically and identified generally by the letter A. Furthermore, there is shown the membrane 22 of the apparatus A as well as the indicator tube 41 including the graduation 103. The indicator apparatus A is connected to a selecting apparatus B, with which now a selective indication of the levels $H_1$, $H_2$, or $H_3$, respectively, of a liquid body each X, Y or Z, respectively, can be made, such liquid bodies being for instance present in the crankcase, in the sump of the automatic transmission and in the sump of the hydraulic oil of a motor vehicle having an internal combustion engine, an automatic transmission and a hydraulic spring arrangement.

Figure 4:
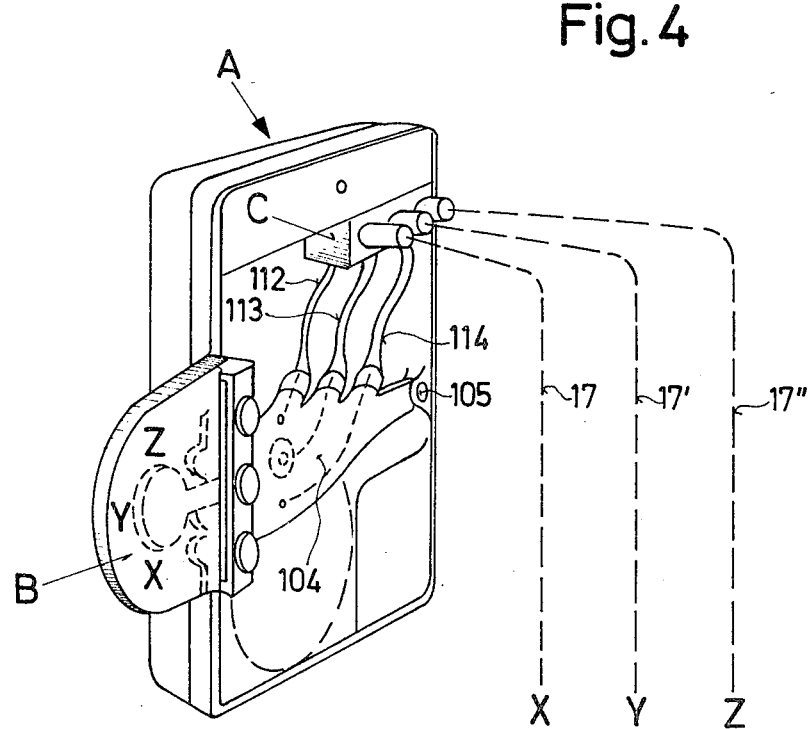
FIG. 4 is a perspective view of the rear side of an embodiment of the present invention.

The selecting apparatus B comprises a selecting member having the shape of a selecting arm 104. This selecting arm 104 is at one end pivotably connected by means of a pivot pin 105 to the rear side of the indicating apparatus A (FIG. 4). A pressing member 107 which is biassed by means of springs 106 urges the selecting arm 104 against the pipe stub 23. (The hose 17 designed schematically in FIG. 1 is in this case accordingly not directly connected to the pipe stub 23.) This arrangement allows that the pipe stub 23 may be brought into an airtight connection to one of three hose connectors 109, 110, 111 arranged on the selecting arm 104, depending on the selected position of this selecting arm 104. The hose connectors 109, 110 and 111 are connected to short flexible hoses 112, 113, 114, which hoses are connected to a carrier block C, which in turn is connected to stronger and possibly more rigid hoses 17, 17' and 17'' (see also FIGS. 1a, 1b) which are shown in FIG. 2 with broken lines and which hoses 17, 17', 17'', respectively, lead to the measuring tubes 118, 119, 120, which are dipped into the liquid bodies X, Y and Z, respectively, and are located at a certain position regarding the liquid bodies, namely such that their lower end rims are arranged at a lower height than any allowable lowest oil level or liquid level, respectively of the liquid bodies.

In order to allow an exact positioning of the selecting arm 104 in any one of the selecting positions three notches 121 are formed in the side wall 122 of the casing of the apparatus. The selecting arm 104 is provided with a stem section 123, which is arranged to enter into the notches 121. Thereby, the spring biassed pressing member 107 ensures an airtight connection between the pipe stub 23 and the corresponding connections 109, 110 and 111, respectively, and in the position as shown in FIG. 2 specifically with the connection 110, which by means of hose 113, of carrier member C, of hose 17' and measuring tube 119 is in communication with the liquid body Y. The selecting arm 104 is operated by the aid of a grip 124 arranged at the end of stem 123. When switching the selecting arm 104, the grip 124 is urged in the direction of the arrows 125 (FIGS. 2 and 3), such as to free the stem 123 from its notch 121, whereupon the selecting arm 104 can be moved from the center position "Y" shown in the figures either upwards into the position "Z" or can be lowered into the position "X" such as indicated by means of the arrows 126 and 127, respectively, which selecting arm 104 is obviously pivoted around the pivot 105. In case a pivoting towards "X" is made, the connection 109 is brought into communication with the pipe stub 23, whereby a movement into the "Z"-position forms a connection between the connection 111 and the pipe stub 23. In this way the indicator device A may be brought to communicate with the liquid bodies X or Z, respectively, by the intermediary of the above described hose and pipe arrangements.

During the switching movement of the selecting arm 104 it is guided by the toothlike projections separating the notches 121 from each other such that it is moved outwards and accordingly the sealing members arranged on the stub which can be made in any known form are not subject to a too large friction and wear such that an impeccable seal can be maintained during an extended operating time span.

Figure 3:
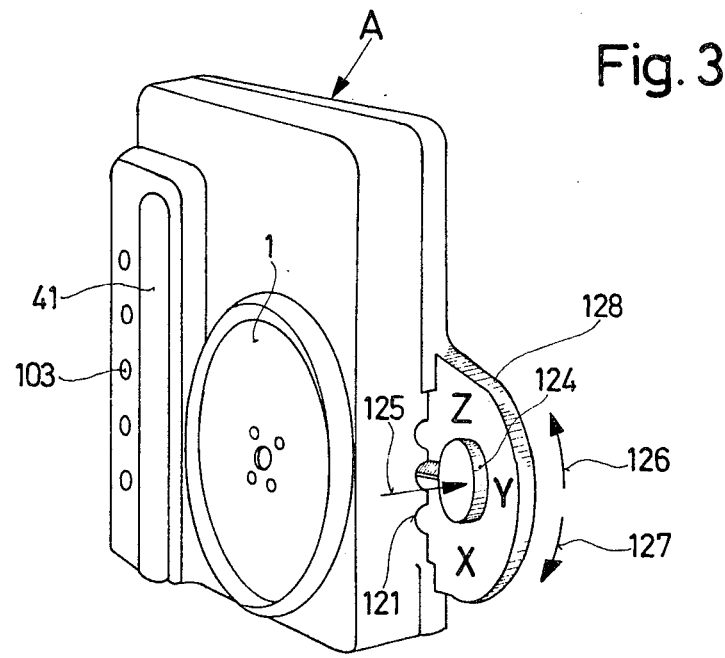
FIG. 3 is a perspective view of the front side of an embodiment of the invention.

In FIGS. 3 and 4 there is shown a preferred embodiment of the liquid level indicator including the switching device arranged for three liquid bodies X, Y and Z. Obviously, the number of selecting positions may be adjusted to operate with two, three or a larger number of liquid bodies. The rear wall of the indicating apparatus is provided with a laterally projecting part 128, which comprises the markings "X", "Y", "Z". In accordance with the three liquid bodies X, Y and Z, respectively, (FIG. 4) the shown arrangement of the selecting arm 104 and of the three narrow hoses 112, 113, 114 between the selecting arm 104 and the carrier member C is shown, from which carrier member C the hoses 17, 17' and 17'', respectively, lead to mentioned liquid bodies X, Y and Z, respectively.

In place of the pivot arm the switching member may also be a sliding member which during the sliding movement may be moved away from the stub by means of any mechanical arrangements.

While there are shown and described present preferred embodiments of the invention, it is to be distinctly understood that the invention is not limited thereto, but may be otherwise variously embodied and practiced within the scope of the following claims.

Accordingly,

What is claimed is:

1. In a vehicle: an apparatus for indicating the level of at least two bodies of different liquids in said vehicle,
   a relatively flat housing mounted in said vehicle, and having a front and a rear,
   a chamber in said housing and having a display tube containing an indicator liquid and being arranged at the front of said housing,
   selecting means arranged at the rear of said housing,
   an air passage connected between said chamber and said selecting means,
   at least two air conduits connected between said selecting means and said at least two bodies of liquid,
   at least two dip tubes immersed respectively in said bodies of liquid and connected each to one of said air conduits,
   air displacing means arranged within said housing and operatively connected to said air passage,
   whereby upon operation of said air displacing means the volume portion of a selected one of said bodies of liquid present inside the selected dip tube is expelled therefrom by air pressurized inside the selected one of said air conduits, whereupon the pressure of said selected body of liquid is brought into communication with said chamber containing said indicator liquid so as to raise the level of said indicator liquid inside said display tube to a level corresponding to the level of said selected body of liquid,
   said selecting means comprising a switching member for individually connecting a selected one of said air conduits with said air passage, said switching member consisting of an arm pivotally supported at one of its ends, the other end carrying a grip protruding laterally from said housing, also comprising a series of notches adapted to receive said arm, each of said notches defining a switching position of said switching member, and a series of projections respectively separating said series of notches, and also comprising a spring arrangement biasing said switching member against a selected one of said notches for a positive guidance thereof,
   whereby upon said switching member approaching any one of said switching positions it is guided for a movement axially of said air passage,
   and whereby in the switching position of said switching member a sealed connection between said switching member and said air passage is established through the action of said spring bias and one of said notches.

* * * * *